Oct. 12, 1926.
G. W. HEBBELER
1,602,485
WHEEL RIM FOR DEMOUNTABLE TIRES
Filed Oct. 27, 1922
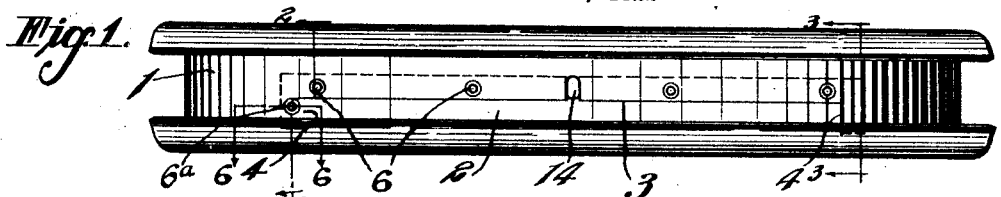
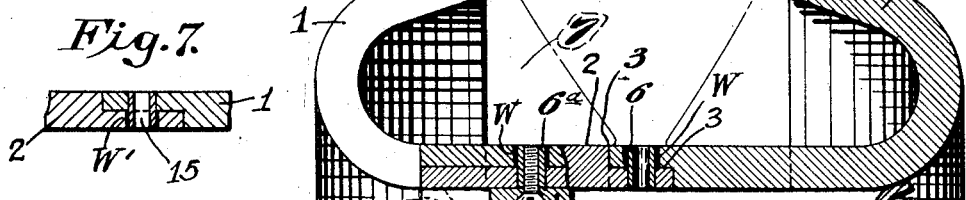
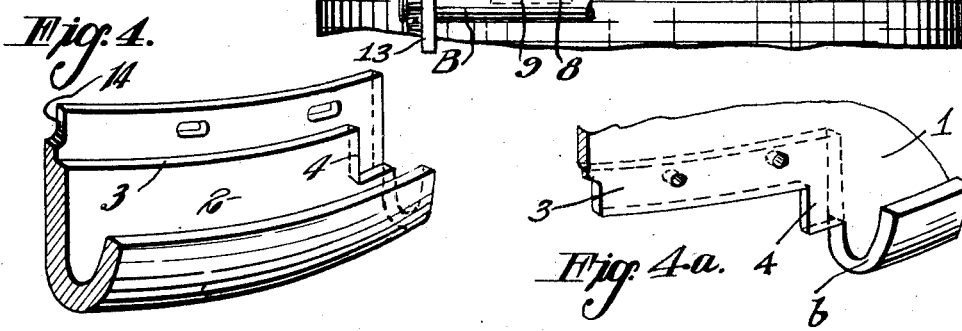
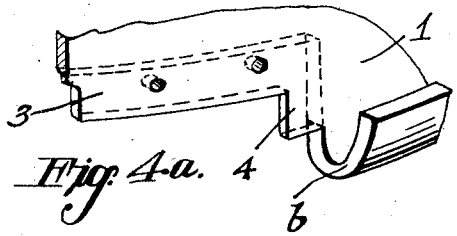
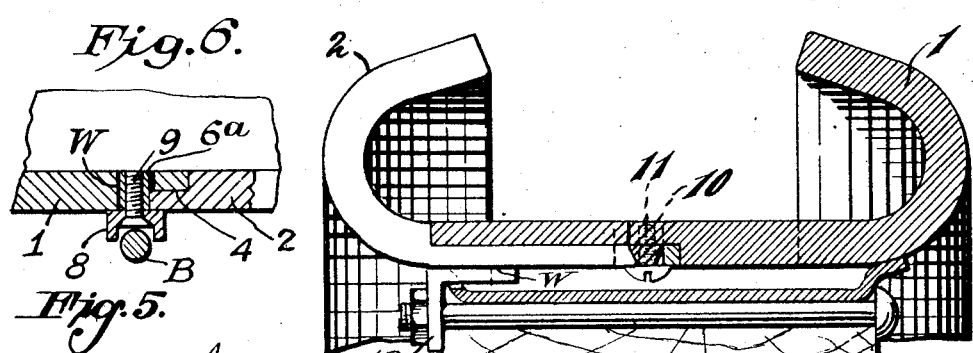
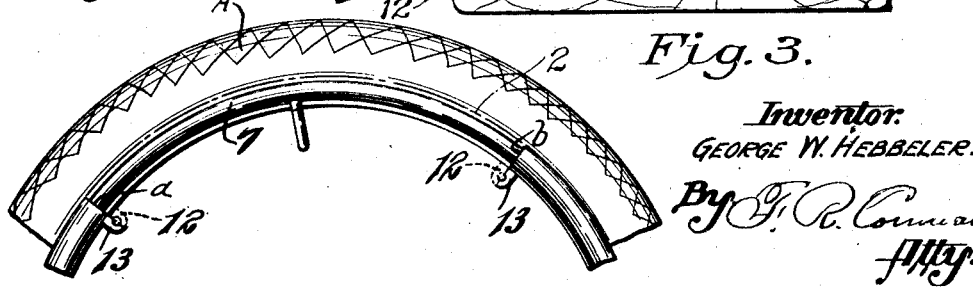
Inventor:
GEORGE W. HEBBELER.
By F. R. Cornwell
Atty.

Patented Oct. 12, 1926.

1,602,485

UNITED STATES PATENT OFFICE.

GEORGE W. HEBBELER, OF ST. LOUIS, MISSOURI.

WHEEL RIM FOR DEMOUNTABLE TIRES.

Application filed October 27, 1922. Serial No. 597,294.

My invention relates to rims for vehicle wheels and consists in a sectional rim especially adapted for clincher tires.

The object of my invention is to facilitate the removal and application of clincher tires to a demountable rim.

As is well known to those familiar with automobile tires of the clincher type, the greatest difficulty,—indeed, generally the only trouble,—is encountered in getting the first portion of the tire off of one side of the rim when the tire is being removed, or in getting the last portion of the tire onto the rim when the tire is being mounted. I eliminate these difficulties by making a substantial portion of one side of the rim easily removable from the main body of the rim and so construct the two portions of the rim that when they are assembled and in use they will be rigidly secured to each other.

In the accompanying drawings which illustrate selected embodiments of my invention,—

Figure 1 is an edge view of a complete rim.

Figure 2 is a transverse section through the rim taken on line 2—2 of Figure 1.

Figure 3 is a similar section taken on line 3—3 of Figure 1.

Figure 4 is a perspective of a portion of the removable section.

Figure 4ª is a perspective of an adjacent portion of the rim body.

Figure 5 illustrates a portion of the rim with a tire mounted thereon, and with the removable section of the rim and portions of rim lugs attached thereto shown in dot-and-dash lines.

Figure 6 is a longitudinal vertical section on line 6—6 of Figure 1.

Figure 7 is a fragmentary transverse section corresponding to Figure 6 but illustrating a modified construction.

The rim, having the usual cross section presented in Figures 2 and 3, consists of a main portion 1 formed in a single piece and a removable portion 2 comprising a section half of the width of the rim and approximately a quarter of its circumference. The longitudinal meeting edges of the body 1 and section 2 and a portion of their transverse meeting edges are preferably shiplapped at 3 and 4, as shown in Figures 2, 3 and 6, to more securely fit the two portions of the rim together. The shiplap flange upon section 2 preferably is provided with perforations 5 at intervals to receive corresponding pins or hollow studs 6 mounted upon the body 1 of the rim and the engagement of section 2 by studs 6 normally prevent lateral movement of section 2 from the rim body. These studs may be mounted upon the body by welding and the welding of these and other elements to the body is indicated at various places by the reference letter W. The studs may be tapered as shown in Figure 3 or the holes for the studs may be slightly elongated as shown exaggerated in Figure 4 to accommodate the extension of the studs at angles to the line of movement of section 2 when the latter is applied and removed from the body of the rim.

To remove section 2 from the rim, it is necessary to tilt its inner edge toward the axis of the rim so as to disengage the section from studs 6, whereupon the sections may be withdrawn freely from the rim body, in a line parallel with the rim axis, leaving the corresponding portion 7 of the tire A unrestrained and free to extend in a straight line between the points a and b on the rim (Figure 3) corresponding to the normal position of the ends of section 2. This freeing of the tire will enable one to easily raise the tire bead over the ends a and b of the flange of the rim body whereupon the tire may be removed from the rim without difficulty.

In all of the above described conditions and operations, it is assumed that the tire is deflated. When removable section 2 is assembled with the body 1 of the rim and the tire is inflated, the pressure in the tire is amply sufficient to hold the section and body aligned; hence they will be securely locked against relative movement parallel with the axis of the rim.

In other words, with substantial pressure in the tire, it will be impossible to tilt the shiplapped flange of section 2 inwardly to clear the studs which hold it against transverse movement away from the body of the rim.

While all of the studs may be secured to the rim as indicated in Figure 2, it is also feasible to secure them to the removable section as indicated by the construction shown in Figure 7 in which the stud 15 is welded to the removable section 2 at W'. If desired, some studs may be secured to the rim and some to the removable section. In Figures 2 and 6 I show a lug 8 secured to the inner face of the rim by a screw 9 threaded into a stud 6ª. The flat face of lug 8 overlies the meeting edges of the body of the rim and of the removable section and serves as an additional bearing or aligning element for the removable section. It will be understood that lug 8 also serves as an anti-slipping element to prevent rotation of the rim upon the wheel because of the engagement of the lug with the rim bolt B passing through the wheel felly. When lug 8 is used, it is necessary to remove screw 9 and the lug before section 2 can be disassembled from the rim body.

At times, especially when there is no tire mounted upon the rim, it may be desirable to lock the removable section 2 to the body 1 of the rim. This may be done by inserting one or more screws into one or more of the studs, the head of each screw engaging the removable section 2, thereby clamping the two parts together. This arrangement is shown in Figure 3 in which a stud 10 is mounted on the rim body 1 and a screw 11 serves to clamp the removable section to the rim body. Obviously, this screw locking of the parts is not essential to prevent movement of section 2 straight to the left, and if screw 11 is not present its omission will not affect the security of the assembly of the removable section with the body of the rim so long as an inflated tire is on the rim.

The rim is secured to the wheel felly by ordinary lugs. Preferably, two of the rim attaching lugs may be split through their middles with one half 13 of each one secured to the rim body and the other half 12 of each one secured to the removable section. With this disposition of the lugs, the rim attaching bolts B also help to retain the removable section in place. If the rim is a demountable one, the nuts for the bolts B must be removed in any case before the rim is taken from the wheel. Hence, the split lug construction just described will not necessitate any additional work in removing a tire from a demounted rim. With this construction an additional anti-slipping lug, such as indicated at 8, will not be necessary, although it may be retained if desired. In manufacturing the rims, it will not be necessary to manufacture some rims with studs 6ª for the lugs 8 and other rims without such studs, as the studs can be provided on all rims and when a rim is sold, if the lug 8 is not wanted, the stud 6ª may be easily removed with a hacksaw.

In order to first apply and first remove that portion of the tire through which the valve stem projects, I provide stem receiving slots 14 in the lapped flanges of the two parts of the rim, and the inner ends of these slots, when the slots are aligned by assembly of the two rim parts, form a hole for the stem corresponding to the stem opening in the ordinary rim.

I claim:

1. In a demountable rim comprising a body and a removable section, cooperating members for holding said body and section in assembled position, lugs at intervals on said body whereby the rim may be bolted to a wheel, and complementary elements on the adjacent portions of said body and removable section, which elements combine to form a single bolt engaging lug.

2. In a demountable rim, a body having lugs at intervals whereby the rim may be bolted to a wheel, and a section removably secured to said body and extending throughout one of said intervals, an element on each end of said section and complementary elements on the adjacent portions of said body, said section and body elements combining to form complete rim bolt lugs.

3. In a vehicle rim, a body, a tire engaging flange on said body having a removable section, pairs of elements secured to said body and section adjacent their meeting edges, each pair of elements cooperating to form a rim bolt lug, and rim bolts each engaging a pair of said elements to secure the rim section to the body.

4. In a demountable rim for pneumatic tires, a body portion, a bead engaging section separable from said body to facilitate removal of a tire from the rim, said body portion and section having contacting edges, and a removable lug overlying the joint between said body and section and serving to prevent disassembly of the rim and to engage a rim bolt to prevent rotation thereof about the wheel felly.

5. In a vehicle rim for a pneumatic tire, a rigid body having an elongated recess with side and end edges at right angles to each other, a removable section fitting into said recess, the longitudinal and transverse meeting edges of said body and section being shiplapped, presenting a smooth internal periphery for the rim, and removable from each other, when a tire mounted on the rim is deflated, without distortion of said body or section and without centrifugal movement of said section relatively to said body.

6. In a vehicle rim for a pneumatic tire, a body, a rigid removable section having longitudinal and transverse edges forming an angle with each other not less than ninety degrees and shiplapped with said body to form a smooth internal periphery for the rim, elements holding said section against movement laterally from said body when an inflated tire is mounted on the rim, the inner edge of said section being tiltable toward the center of the rim when such a tire is deflated to disengage said elements and permit said section to be removed laterally from said body.

7. In a vehicle rim for a pneumatic tire, a body recessed for substantially half its width and a fourth of its periphery, a removable member fitting the recess, studs fixed on one of said members, the other of said members being provided with openings for receiving said studs, said studs and openings being disposed so as to hold said member against relative lateral movement, the studs being disengaged from the openings by movement of said removable member centripetally of said body member.

8. In a vehicle rim for a pneumatic tire, a body recessed for substantially half its width and a fourth of its periphery, a removable member fitting the recess, said members being reduced in thickness along their meeting edges to form a shiplapped joint, studs fixed on one of said members, the other of said members being provided with openings for receiving said studs, said studs and openings being disposed so as to hold said member against relative lateral movement, the studs being disengaged from the openings by movement of said removable member centripetally of said body member.

In testimony whereof I hereunto affix my signature this 18th day of October, 1922.

GEORGE W. HEBBELER.